(12) United States Patent
McWilliams (10) Patent No.: US 12,380,404 B2
(45) Date of Patent: *Aug. 5, 2025

(54) SYSTEMS FOR MONITORING AND REORDERING SUPPLIES

(71) Applicant: Jonathan McWilliams, Seattle, WA (US)

(72) Inventor: Jonathan McWilliams, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,261

(22) Filed: May 28, 2024

(65) Prior Publication Data

US 2024/0311758 A1    Sep. 19, 2024

Related U.S. Application Data

(63) Continuation of application No. 17/394,847, filed on Aug. 5, 2021, now Pat. No. 12,026,669.

(60) Provisional application No. 63/062,896, filed on Aug. 7, 2020.

(51) Int. Cl.
  *G06Q 10/0875*    (2023.01)
  *G06Q 30/0283*    (2023.01)
  *G06Q 30/0601*    (2023.01)

(52) U.S. Cl.
  CPC ..... *G06Q 10/0875* (2013.01); *G06Q 30/0283* (2013.01); *G06Q 30/0605* (2013.01)

(58) Field of Classification Search
  CPC .......... G06Q 10/0875; G06Q 30/0283; G06Q 30/0605
  USPC ......................................................... 705/29
  See application file for complete search history.

(56) References Cited

U.S. PATENT DOCUMENTS

| | | | |
|---|---|---|---|
| 11,126,955 B1 * | 9/2021 | Watson | G06Q 10/087 |
| 2005/0010323 A1 * | 1/2005 | Cocciadiferro | G05B 23/0283 700/174 |
| 2018/0053153 A1 * | 2/2018 | Mai | G06Q 10/0875 |
| 2022/0215339 A1 * | 7/2022 | Borke | G06Q 10/0875 |

* cited by examiner

*Primary Examiner* — Garcia Ade
(74) *Attorney, Agent, or Firm* — Mohr Intellectual Property Law Solutions, PC (57) ABSTRACT

Supply management systems including a load cell and a computer. The load cell is configured to detect a current weight of a supply item supported on the load cell. The computer is in data communication with the load cell and with multiple suppliers of the supply item. The computer is configured to receive reorder parameter data defining reorder parameters for the supply item, receive current supplier data for the supply item from the multiple suppliers, dynamically compare the current weight of the supply item from the load cell with a reorder threshold weight value, and automatically select a selected supplier of the supply item from the multiple suppliers based on a comparison of the reorder parameter data with the current supplier data when the current weight is less than or equal to the reorder threshold weight value.

19 Claims, 8 Drawing Sheets

SYSTEMS FOR MONITORING AND REORDERING SUPPLIES

CROSS REFERENCE TO RELATED APPLICATIONS

This application claims priority to copending U.S. application Ser. No. 17/394,847, filed on Aug. 5, 2021, which claims priority to U.S. Provisional Application No. 63/062,896, filed on Aug. 7, 2020, which is hereby incorporated by reference for all purposes.

BACKGROUND

The present disclosure relates generally to systems for monitoring supplies. In particular, automated systems for monitoring and reordering supplies are described.

Regularly monitoring quantities of supplies of various items is important to maintain adequate amounts of those items on hand. Items for which people often monitor supplies include groceries, office supplies, pet food and water, cleaning supplies, fasteners, such as nails, screws, and staples, and a wide variety of other supplies. In a laboratory setting, people may monitor supplies of chemicals, protective equipment, such as gloves and facemasks, and disposable items, such as containers, wipes, and the like. People working in industrial settings have multitudes of supplies that need to be monitored.

Monitoring supplies is tedious and prone to be neglected. Failing to consistently and effectively monitor supplies can result in running out of a given supply at an inopportune time. Running out of a supply can be inconvenient, can prevent one from completing a project, and can hold up production of a manufacturing process. Conventional methods to monitor supplies are often inconvenient in that they require one to open containers to inspect contents or to estimate how much of a given supply remains.

Reordering supplies when needed is also tedious and can be time consuming. Traveling to a store to purchase more supplies is inefficient and involves exposure to other people potentially infected with a contagious virus. Manually contacting a supplier or searching for a product online can be difficult and prone to procrastination. Reorder button devices offered by certain retailers require manually activating the devices and limit consumers to a single retailer, which may not be economically advantageous.

Thus, there exists a need for systems that improve upon existing systems and methods for monitoring and reordering supplies. Examples of new and useful systems for monitoring and reordering supplies are discussed below.

SUMMARY

The present disclosure is directed to supply management systems including a load cell and a computer. The load cell is configured to detect a current weight of a supply item supported on the load cell. The computer is in data communication with the load cell and with multiple suppliers of the supply item. The computer is configured to receive reorder parameter data defining reorder parameters for the supply item, receive current supplier data for the supply item from the multiple suppliers, dynamically compare the current weight of the supply item from the load cell with a reorder threshold weight value, and automatically select a selected supplier of the supply item from the multiple suppliers based on a comparison of the reorder parameter data with the current supplier data when the current weight is less than or equal to the reorder threshold weight value.

DETAILED DESCRIPTION

The disclosed systems for monitoring and reordering supplies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of system examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Systems for Monitoring and Reordering Supplies

With reference to the figures, systems for monitoring and reordering supplies will now be described. The systems discussed herein function to monitor quantities of supplies as the supplies are used. Further, the systems described below function to automatically order more supplies when the detected quantity of a supply is less than a threshold quantity. In some examples, the system compares terms of sale from multiple suppliers and orders more supplies based on predetermined reorder criteria.

The reader will appreciate from the figures and description below that the presently disclosed systems address many of the shortcomings of conventional systems for managing supplies. For example, the systems described herein avoid the tedium associated with conventional approaches to monitoring supplies. The automated supply monitoring systems described below reduce the risk that monitoring supplies will be overlooked or neglected.

By providing more convenient means to consistently and effectively monitor supplies, the presently described systems help avoid supplies running out at inopportune times. Through their improved features, the systems described in this application increase convenience for the user, avoid instances where one is unable to complete a project because of a lack of supplies, and allow manufacturing processes to operate more consistently and with less downtime. Unlike with conventional methods to monitor supplies that require one to inconveniently open containers to inspect contents or to estimate how much of a given supply remains, the systems described herein automatically communicate how much of a supply remains at a given time without requiring the user to hassle with the supply container or contents.

The presently described systems also avoid the tedium and time consumption associated with reordering supplies when needed. With the systems described below, a user does not need to inefficiently travel to a store to purchase more supplies or subject himself or herself to potential exposure a contagious virus. The systems described in this document also avoid the need to manually contact a supplier or to search for a product online, which helps make the reordering process easier and less prone to procrastination. Improving over conventional reorder button devices offered by certain retailers, the user does not need to manually activate the presently described systems and is not limited to a single supplier.

Contextual Details

Ancillary features relevant to the systems described herein will first be described to provide context and to aid the discussion of the systems.

Supply Item

Figure 1:
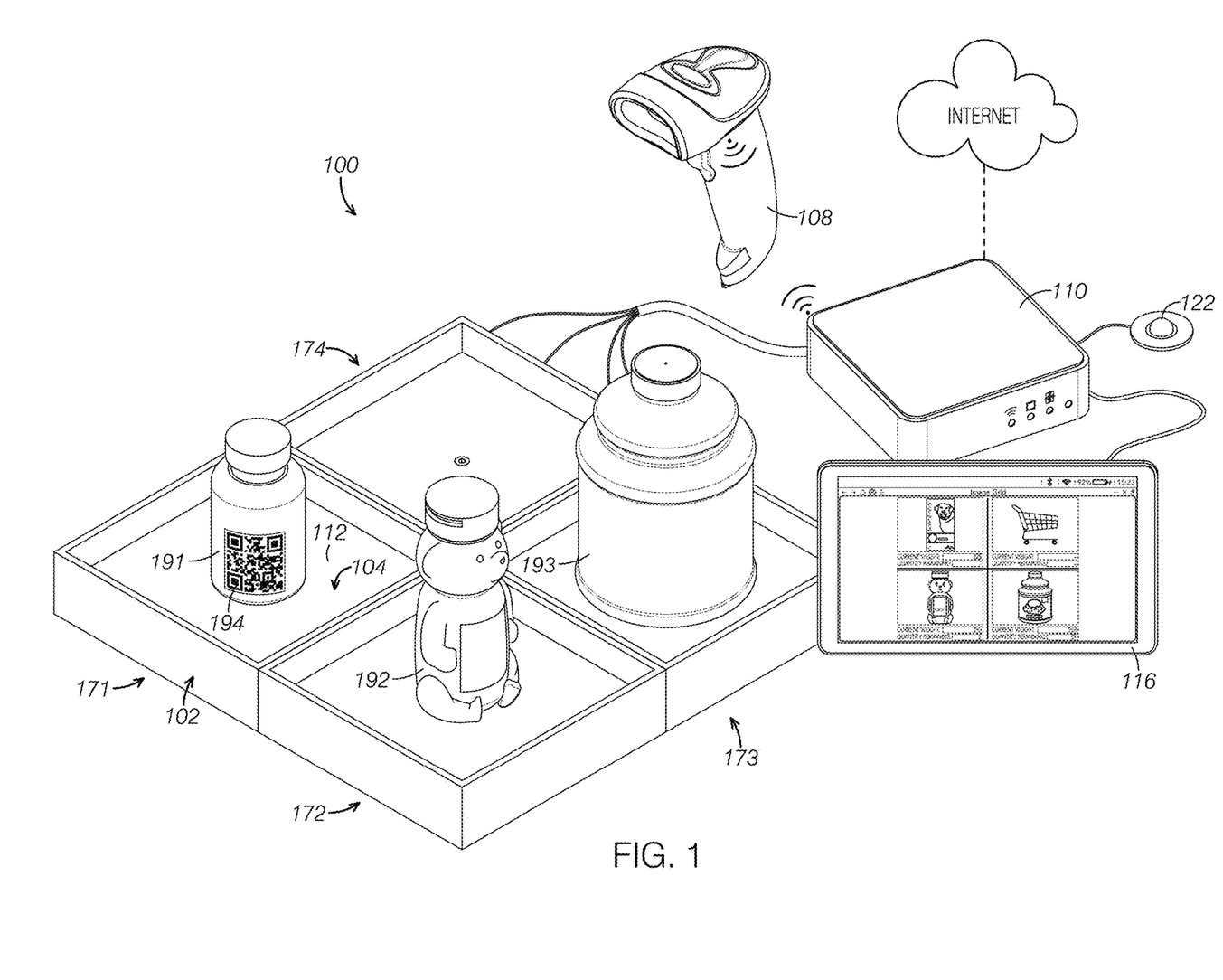
FIG. 1 is a perspective view of a supply management system including multiple supply management units each supporting and monitoring the weight of a different supply item.
Figure 3:
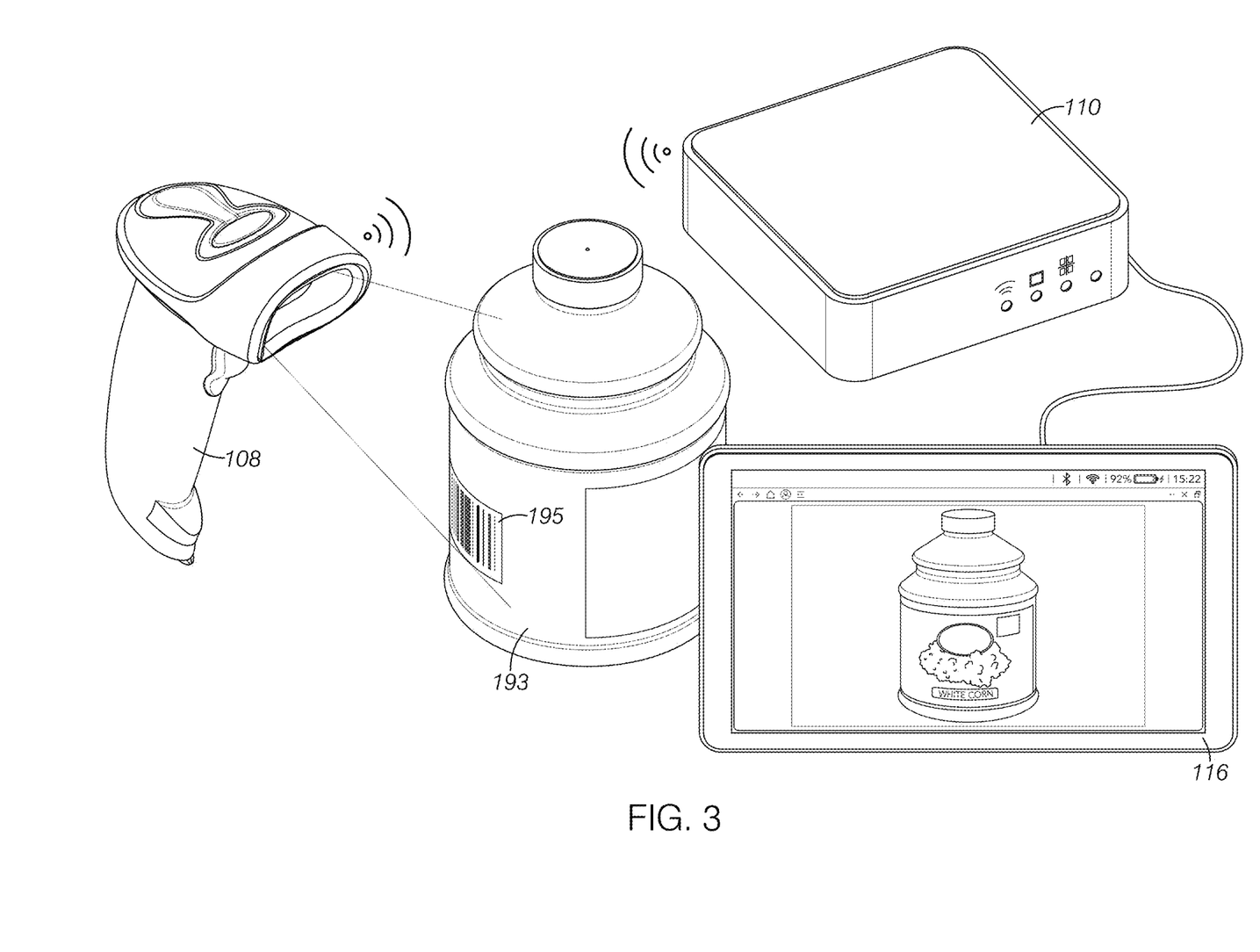
FIG. 3 is a view of an optical scanner reading a barcode on a supply item and the display depicting an image of the supply item based on the barcode just read.
Figure 6:
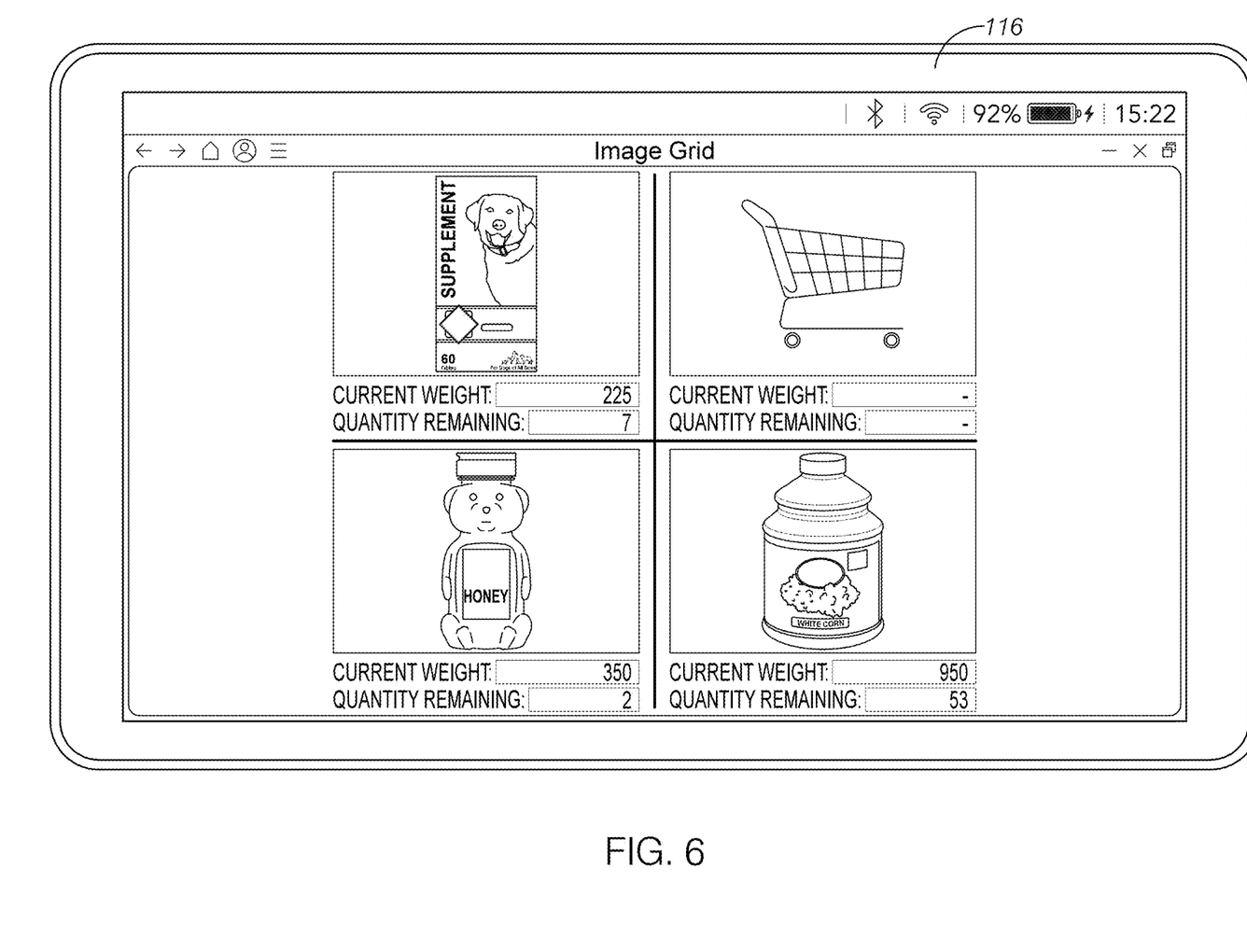
FIG. 6 is a user interface displayed on the display depicting images of the supply items monitored by each supply management unit, the current weight of each supply item, and the quantity remaining of the supply item.

Supply items are monitored and reordered with the systems described herein. FIGS. 1, 3 and 6 depict a first supply item 191 in the form of a bottle of dog supplements, a second supply item 192 in the form of a bottle of honey, and a third supply item 193 in the form of a package of corn kernals. However, the supply items may be any currently known or later developed type of item, such as office supplies, foods and beverages, tools, fasteners, paper products, and the like.

As shown in FIGS. 1 and 3, first supply item 191 includes a first code 194 and third supply item 193 includes a second code 195. In the present example, first code 194 is a QR code and second code 195 is a barcode. An item identifier 108 of system 100 is configured to read barcodes and QR codes among other types of codes.

Systems for Monitoring and Reordering Supplies Embodiment One

With reference to FIGS. 1-7, a first example of a system, system 100, will now be described. System 100 includes a first supply management unit 171, a second supply management unit 172, a third supply management unit 173, a fourth supply management unit 174, a item identifier 108, a computer 110, a display 116, and an indicator 122. In some examples, the system does not include one or more features included in system 100. For example, some system examples do not include as many supply management units, a code reader, an indicator, or a display. In other examples, the system includes additional or alternative features, such as input devices or an enclosure.

Supply Management Units

The supply management units function to support supply items and to detect the weight of the supply items. System 100 shown in FIGS. 1-7 includes four supply management units, each including a platform, a weight detector, and a frame. In some examples, the system includes a single supply management unit, two units, three units, or four or more units. Each supply management unit is in data communication with computer 110

Each supply management unit of system 100 is configured the same in the present example. However, the supply management units may be configured differently in other examples. For the sake of brevity, the components of just one of the supply management units, first supply management unit 171 including a frame 102, a platform 104, and a weight detector 106, will be labeled with reference numbers and discussed in detail. The reader should understand that the discussion of first supply management unit 171 applies to the other depicted supply management units as well.

Platform

Platform 104 functions to support supply items. In the example shown in FIGS. 1 and 2, platform 104 is supported on weight detector 106 and surrounded by frame 102. In some examples, a user places a supply container on the platform, such as placing a box of paperclips on the platform. In other examples the platform is configured for the supply item to be placed directly on the platform, such as dumping paperclips from a box onto the platform.

Figure 2:
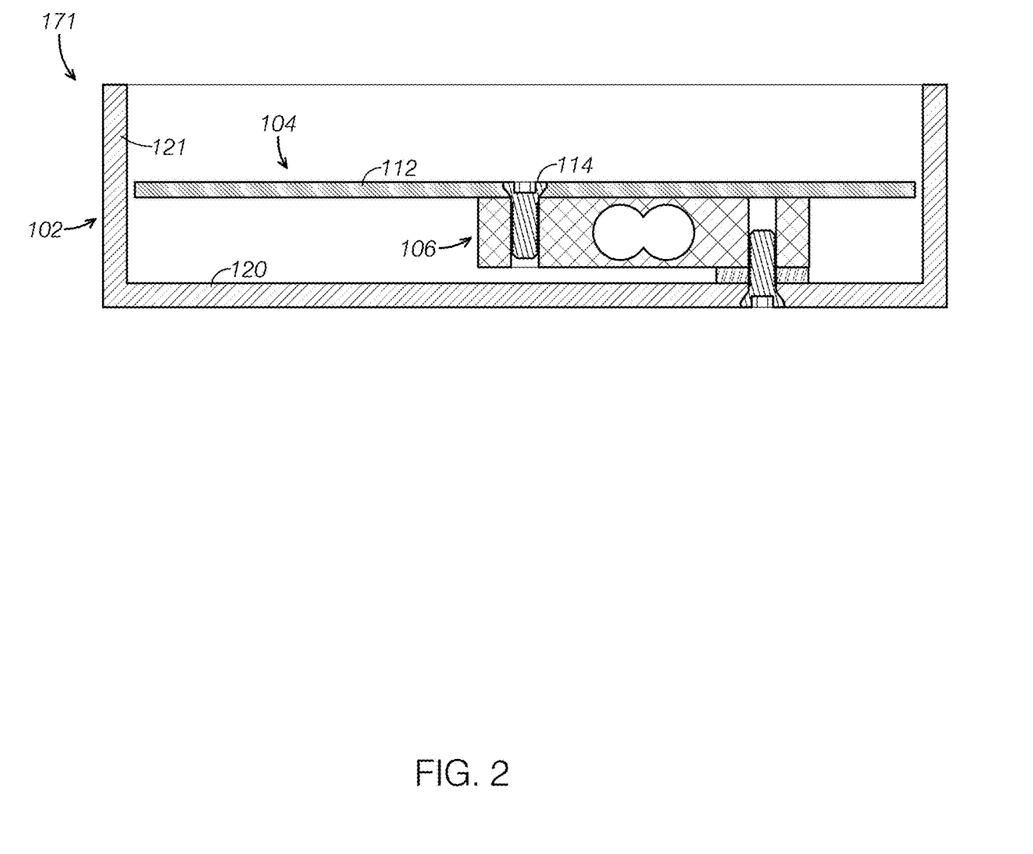
FIG. 2 is a side elevation cross section view of one supply management unit depicting a platform supported on a load cell within a frame.

As shown in FIGS. 1 and 2, platform 104 includes a floor 112 and a screw 114 extending through floor 112. Floor 112 and screw 114 are rigidly coupled, but allow for mechanical adjustment of the relative position of screw 114 and floor 112. Screw 114 extends to and couples with weight detector 106.

In the example shown in FIGS. 1 and 2, a head of screw 114 extends above floor 112. In some examples, the head of the screw is flat and substantially flush with the floor. In certain examples, the floor defines a recess and the head of the screw rests within the recess. In examples where the floor includes a recess for the head of the screw, the screw head may be flush with the floor or may be disposed below the level of the floor. In some examples, the screw extends above the floor such that the head of the screw is spaced above the floor.

As shown in FIGS. 1 and 2, platform 104 is planar, but is other shapes in other examples. For example, the platform may define a bowl, a tray, a trough, a cup, a tank, or a vessel. In examples where the platform is configured to support a supply item directly rather than a package containing the supply item, the platform may be configured as appropriate to contain the supply item, such as being a bowl, trough, cup, tank or vessel to contain a liquid or powder supply item or a plurality of supply items like paperclips, grapes, screws, or washers.

Platform 104 is formed from plastic, but is formed by other materials in other examples. For example, the platform may be formed from glass, metal, wood, or composites. The platform may be formed from any currently known or later developed material suitable for supporting a given supply item or supply container.

Weight Detector

Weight detector 106 serves to detect the weight of supply items supported on platform 104 and to communicate the weight to computer 110. In the present example, weight detector 106 is configured to continuously detect the weight of supply items placed on platform 104. In other examples, the weight detector detects the weight of supply items on the platform at selected times or at discrete, extended time intervals. The weight of a supply item at a given time may be referred to as a current weight of the supply item In the example shown in FIG. 2, weight detector 106 is a load cell. In other examples, the weight detector is a scale, strain gauge, or other similar devices configured to measure the weight or mass of an item. The weight detector may be any currently known or later developed device to measure mass or weight.

Frame

Frame 102 functions to contain and protect other components of first supply management unit 171, including platform 104 and weight detector 106. As can be seen in FIGS. 1 and 2, frame 102 is in the shape of an open box. Frame 102 includes a floor 120 and four sidewalls 121. In other examples, the container adopts different shapes than shown in FIGS. 1 and 2, such as circular, oval, triangular, pentagonal, other regular polygons, and irregular shapes.

As shown in FIGS. 1 and 2, frame laterally surrounds platform 104 and weight detector 106. Weight detector 106 is supported on floor 120 and surrounded by sidewalls 121. Thus, weight detector 106 is enclosed by frame 102 and platform 104.

In the example shown in FIGS. 1 and 2, frame 102 is formed from plastic. In other examples, the container is formed from additional or alternative materials, such as metals, wood, and composites. The container may be formed from any currently known or later developed material.

Item Identifier

Item identifier 108 functions to read a bar code, QR code, or other identifying indicia associated with a supply item and to communicate the identifying information to computer 110. Computer 110 includes a processor programmed with instructions to access data correlating the identifying information from item identifier 108 to a given supply item.

In the present example, as shown in FIGS. 1-3, item identifier 108 is a handheld device. However, the identifier may be any currently known or later developed device configured to obtain information from a code associated with a supply item, including stationary code readers.

Item identifier 108 is configured to obtain data from identifying indicia optically. Expressed another way, item identifier 108 is an optical scanner or code reader. Additionally or alternatively, the indicator may obtain information from the identifying indicia via data communication, such as wireless data communication. Any suitable data communication protocols may be used, such as Bluetooth, WiFi, and the like.

Computer

Computer 110 functions to receive data from weight detector 106 and item identifier 108 and to execute programmed instructions. Computer 110 further functions to communicate resupply order data to suppliers. Computer 110 also serves to display current supply data on display 116.

As shown in FIGS. 1 and 3, computer 110 is in data communication with weight detector 106 and item identifier 108. Computer 110 is also in data communication with display 116, indicator 122, and multiple suppliers via the internet or World Wide Web.

In the example shown in FIGS. 1-7, computer 110 includes a processor, memory, data communication pathways, and a network communication device. In the present example, computer 110 includes a raspberry pi computer and an Arduino board microcontroller. However, the computer may be any currently known or later developed computer and may include any currently known and later developed computing components.

Figure 4:
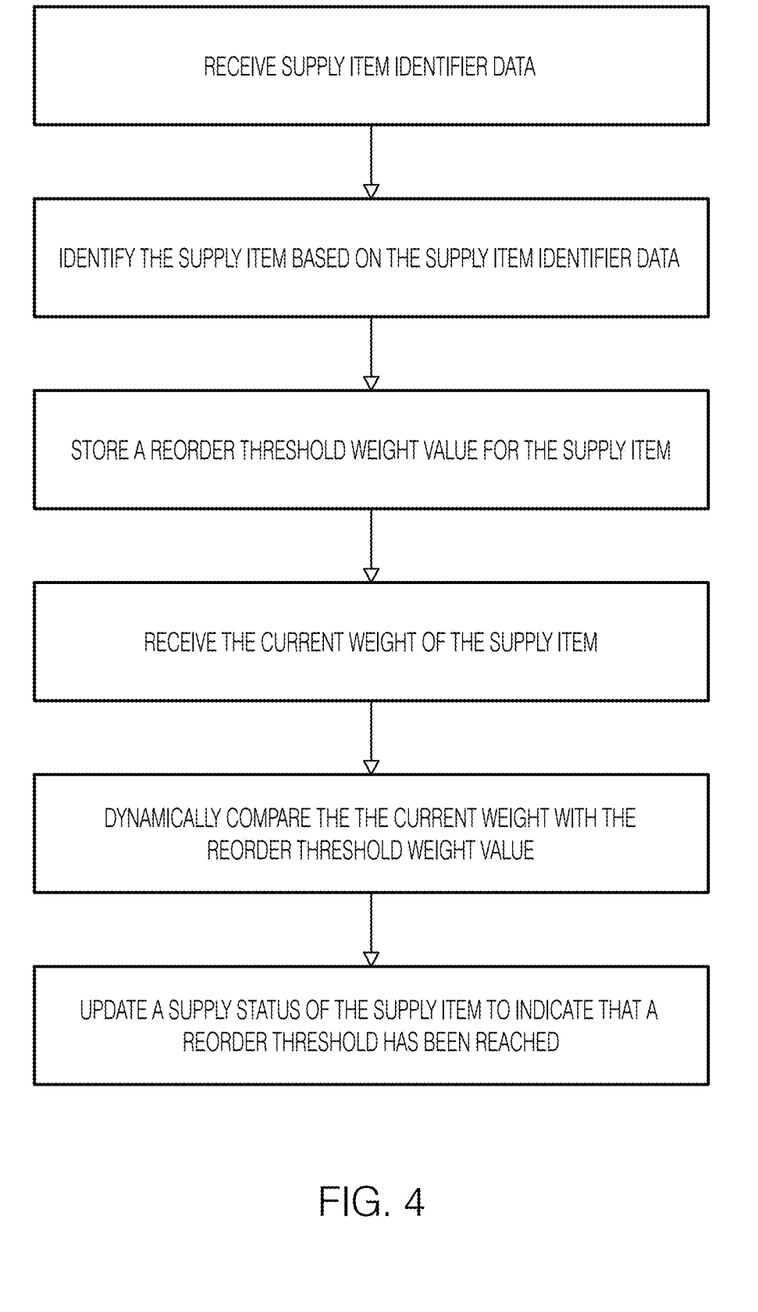
FIG. 4 is a flow diagram depicting a configuration of the computer shown in FIG. 1.

With reference to FIG. 4, the reader can see that computer 110 is specially configured to enable system 100 to manage supply items. As shown in FIGS. 3 and 4, computer 110 is configured to receive supply item identifier data from item identifier 122. Further, computer 110 is configured to identify the supply item based on the supply item identifier data.

In more detail, as shown in FIGS. 3 and 4, computer 110 receives identifying information from item identifier 108 after item identifier 108 inspects a bar code or QR code on a supply item. Computer 110 identifying the supply item associated with the bar code or QR code read by item identifier 108 may be accomplished by computer 110 referencing a data table. For example, a local or remotely accessible data table may correlate supply item identities, standard weights, container weights, image files, and other data with an identifier corresponding to the barcode or QR code displayed on the supply item. The data table may be stored in local memory included in the computer or may be stored in an external data source accessible over a local data network or an external data network, such as the internet.

As can be further seen in FIG. 4, computer 110 is configured to store a reorder threshold weight value for the supply item. The reorder threshold weight value is a weight or weight fraction amount that indicates that a supply item is depleted or close to being depleted. The reorder threshold weight value may be when the supply item has 10% or less of its quantity remaining, 25% or less of its quantity remaining, or another custom weight amount set by the user, such as when the supply item current weight is 30 grams or less.

To establish the reorder threshold weight value, computer 110 is configured to receive empty weight information associated with the supply items on each supply management unit. The empty weight information may be obtained from a data table or by measuring the weight of the container or tray while empty. In some examples, the computer does not rely on empty weight information and instead estimates an empty weight amount.

The empty weight typically corresponds to the weight of a container containing the supply item or a tray supporting the supply item. In examples where a container or tray is not used to contain the supply item, but rather the supply item is supported directly on the platform, the empty weight will be zero. The reader should understand that the weight of the platform is typically tared out of the weight determinations, i.e., accounted for, by the weight detector.

Computer 110 is also configured to receive initial weight information for the supply item to evaluate the percent of the supply item that has been used at a given time. The initial weight corresponds to the weight of the supply item when initially put into service. The initial weight may be obtained from a data table or by measuring the weight of the supply item when initially put into service.

As shown in FIG. 4, computer 110 is configured to receive current weight information from weight detector 106. More broadly, computer 110 is configured to receive current weight information from each supply management unit.

As shown in FIG. 4, computer 110 is configured to dynamically compare the current weight with the reorder threshold weight value. Computer 110 is also configured to update a supply status of the supply item to indicate that a reorder threshold has been reached. In the present example, updating the supply status to indicate that a reorder threshold has been reached occurs when the current weight is less than or equal to the reorder threshold weight value.

As shown in FIG. 6, computer 110 is configured to display current supply data on display 116. In the present example, as can be seen in FIG. 6, the current supply data displayed on display 116 includes an image of the supply item, the current weight of the supply item, and the quantity remaining of the supply item. The current supply data may include other metrics, such as the estimated time until a supply item will be depleted based on usage trends and/or an expiration date for the supply item.

Computer 110 is also configured to determine when the supply currently available is depleted or close to being depleted. The current supply being depleted or close to depleted may be determined by comparing the current weight of supply item to the empty weight information. If the current weight equals the empty weight, then the supply item is depleted. To determine if the supply is close to being depleted, such as 10% of the supply remaining, the computer may divide the current weight by the initial weight to obtain a percentage of the supply remaining.

In the present example, computer 110 is programmed to take actions, such as ordering new quantities of supply items and notifying a user. For example, computer 110 is programmed to notify a user when the current weight of a supply item equals the empty weight of the supply item. Computer 110 is also programmed to automatically place an order for a supply item when the current weight of the supply item is less than or equal to the reorder threshold weight value.

Computer 110 may reorder supplies automatically or in response to user input. To reorder supplies, the computer may be programmed with instructions to communicate with one or more suppliers via the network communication device and to place an order for a given supply. The programmed reordering instructions may include providing login credentials associated with the user's account with a supplier. The user may specify a quantity or quantity range of a supply to order, a ceiling price, a preferred brand, and/or a required delivery timeframe. A combination of reordering factors may be considered when placing an order. In some examples, the computer places the order without approval from the user and in other examples the computer requires user approval before placing an order.

In the example shown in FIGS. 1-7, computer 110 is configured to evaluate multiple suppliers and to automatically place an order with a supplier best meeting the user's reordering parameters. In other examples, the computer is configured to place an order with a single supplier. A wide variety of reordering parameters may be considered by the computer when evaluating from which supplier to place an order and which supply offering among different brands to select.

In the present example, computer 110 is configured to automatically order a resupply of the supply item when current weight of the supply item is less than or equal to the reorder threshold weight value. Additionally or alternatively to automatically ordering more supply items when the reorder threshold has been reached, computer 110 enables a user to manually place an order for more supply items.

Figure 7:
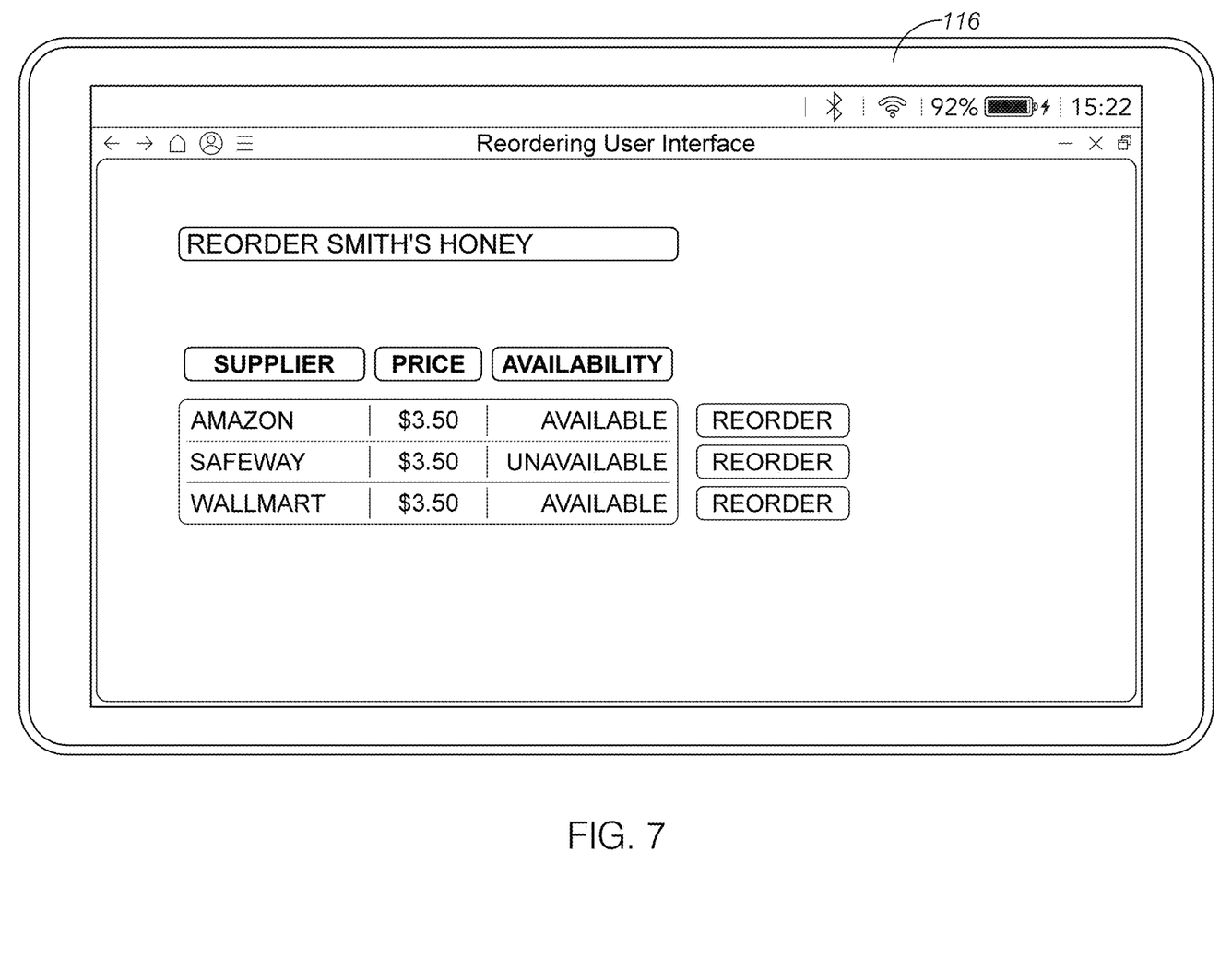
FIG. 7 is a user interface displayed on the display depicting a reordering user interface.

Manually ordering more supply items is facilitated by the user interface displayed on display 116 shown in FIG. 7. The user interface shown in FIG. 7 provides a user with means to compare resupply offerings by different suppliers. Computer 110 is configured to obtain a current price and availability of the supply item from suppliers and to display that price and availability information to the user. In particular, a user is presented with the current price and availability of a given supply item, in the present example, Smith's Honey, from multiple suppliers via the user interface shown in FIG. 7. In some examples, the user interface also displays the delivery timeframe for the supply item.

The user can press the Reorder button for a selected supplier to reorder the supply from the selected supplier at the price and other terms displayed. In the example shown in FIG. 7, the Safeway supplier does not currently have the Smith's Honey supply item available, so the reorder button is grayed out to communicate that it is not currently possible to reorder the supply item from that supplier.

Figure 5:
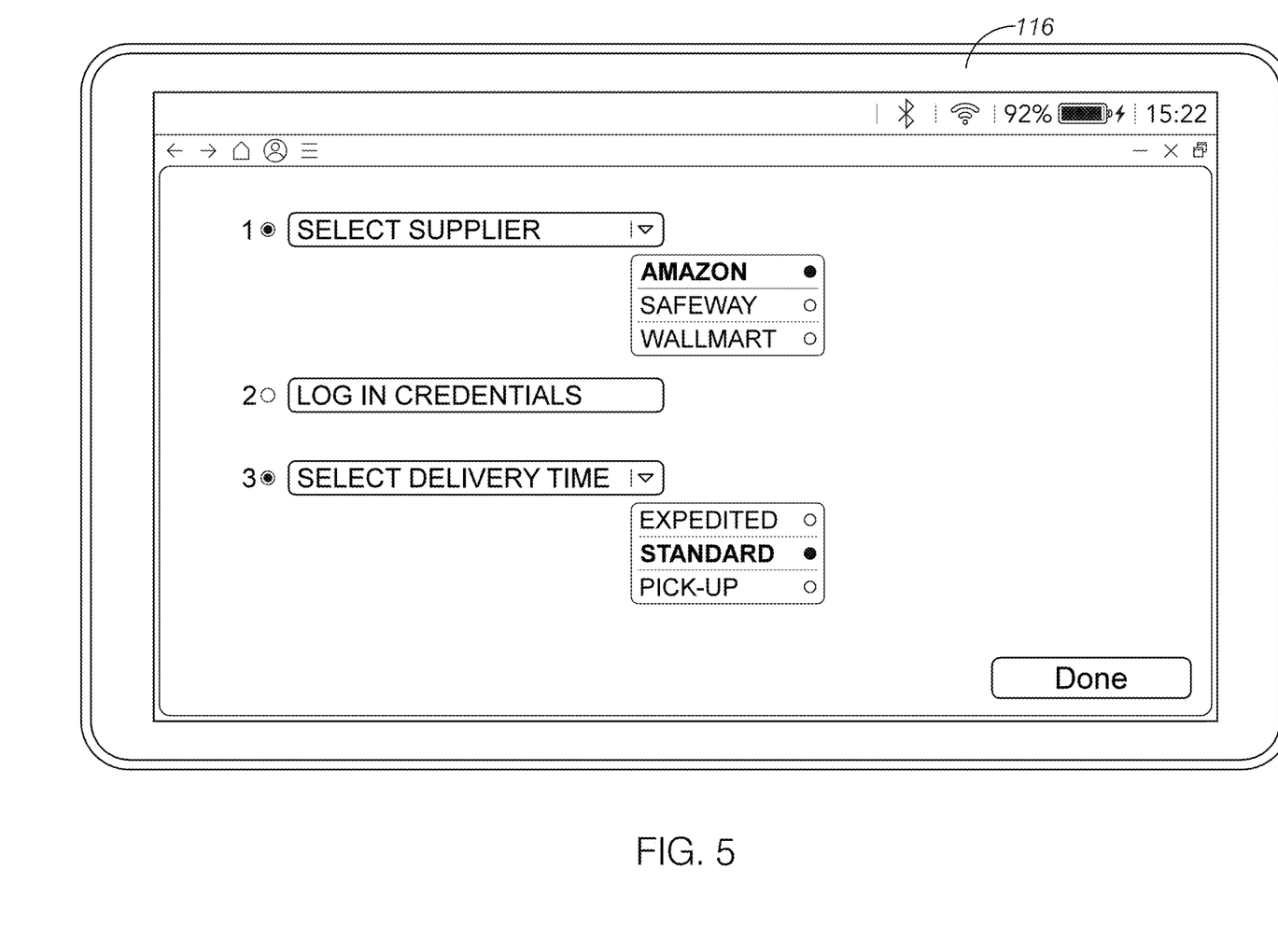
FIG. 5 is a user interface displayed on the display prompting a user to select a desired supplier, enter log in credentials for the supplier, and selected a preferred delivery time.

As shown in FIG. 5, computer 110 is configured to display a user interface for entering suppliers on display 116. The suppliers entered or selected via the user interface of FIG. 5 will be the suppliers from which supply items may be automatically or manually ordered as discussed above and shown in the user interface of FIG. 7.

With reference to FIG. 5, the reader can see that a user is prompted to select a desired supplier, enter log in credentials for the supplier, and to select a preferred delivery timeframe for the supplier to use. The user is presented with a drop down list with commonly used suppliers, Amazon, Walmart, and Safeway in the present example. Additionally or alternatively, the user may manually enter the name of a preferred supplier.

For the preferred delivery time, the user interface provides a drop down list with different delivery timeframe options. In the present example, the delivery timeframe options are Expedited, Standard, and Pick-Up. However, other delivery timeframe options are contemplated. In some examples, the delivery timeframe options are specific for a given supplier and not all suppliers will offer the same delivery timeframe options.

Display

Display 116 functions to display information of relevance to supply management system 100. For example, as shown in FIGS. 1 and 3, display 116 displays information about the supply items supported on the supply management units.

The display may be any currently known or later developed type of computer display. The size and shape of the display may differ from the size and shape of display 116 depicted in the figures.

Indicator

Indicator 122 functions to indicate when a reorder threshold has been reached for a given supply item. Computer 110 is configured to activate indicator 122 when the reorder threshold has been reached. In some examples, the indicator will be activated in different ways based on criteria in addition to a reorder threshold being reached, such as when a supply item is beyond a certain expiration date, has 50% of its total quantity remaining, or a given supply item is on sale with a supplier.

In the present example, indicator 122 is a light emitting diode. However, the indicator may be other types of lights or other types of indicators, such as buzzers, other audio devices, or other visual displays like a digital number or text display. The indicator may be any currently known or later developed type of indicator.

ADDITIONAL EMBODIMENTS

The discussion will now focus on an additional system embodiment. The additional embodiment includes many similar or identical features to system 100. Thus, for the sake of brevity, each feature of the additional embodiment below will not be redundantly explained. Rather, key distinctions between the additional embodiment and system 100 will be described in detail and the reader should reference the discussion above for features substantially similar between the different system examples.

Second Embodiment

Figure 8:
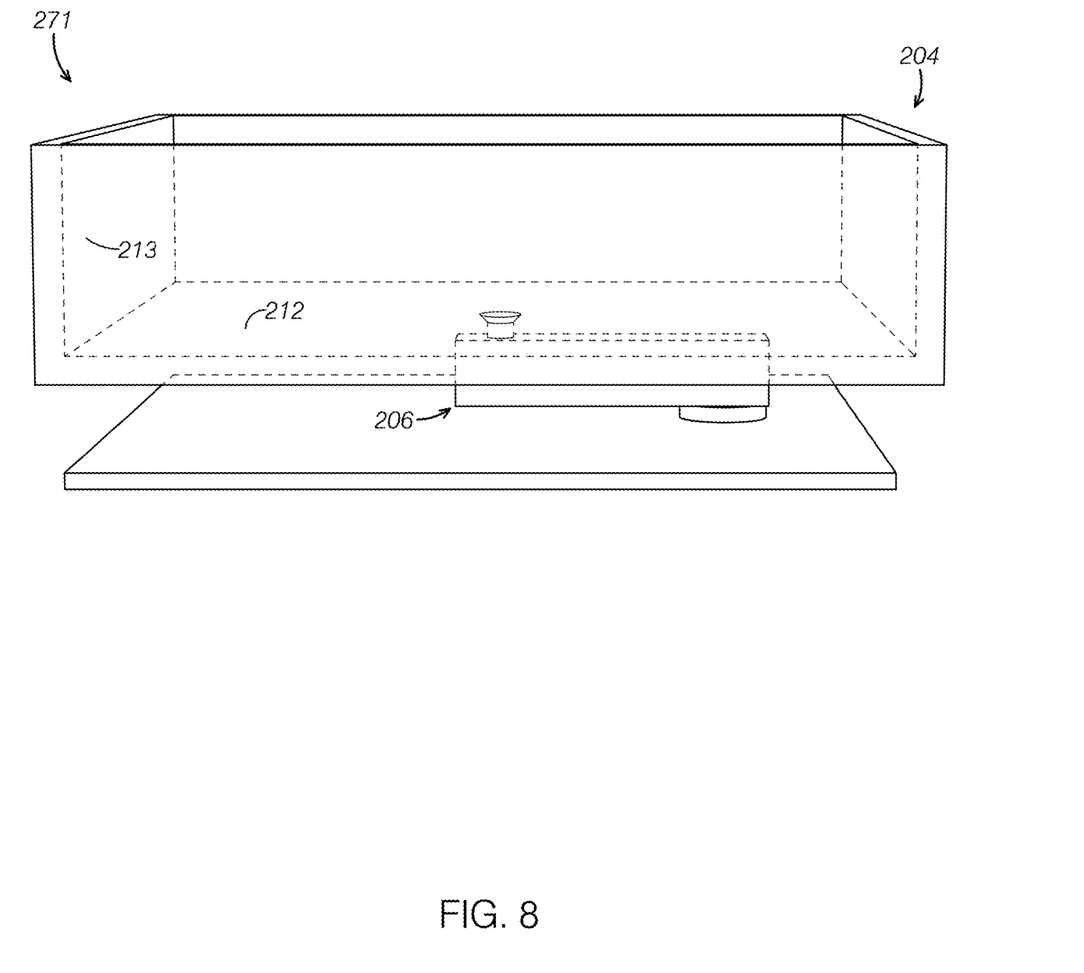
FIG. 8 is a perspective view of an alternative supply management unit.

Turning attention to FIG. 8, a second example of a supply management unit, supply management unit 271, will now be described. Like supply management unit 171, supply management unit 271 includes a weight detector 206 and a platform 204.

A distinction between supply management unit 271 and supply management unit 171, as shown in FIG. 8, is that platform 204 includes a floor 212 and sidewalls 213 extending from floor 212. In the example shown in FIGS. 1 and 2, platform 104 defines a floor 112, but does not include sidewalls. In the system 200 example, platform 204 defines a container to contain a supply item, such as a plurality of paper clips or jelly beans.

The reader can see in FIG. 8, that platform 204 is configured for supply items to be placed within the container it defines. Supply items may be placed directly on floor 212 and bounded by sidewalls 213. Alternatively, a supply item in its own packaging or container may be placed on floor 212.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A supply management system, comprising:
   a supply management unit configured to support a supply item and to detect the weight of the supply item, the supply management unit including:
      a frame;
      a load cell supported on the frame and configured to detect a current weight of the supply item operatively supported on the load cell; and
      a platform supported on the load cell and configured to support the supply item thereon;
   a computer in data communication with the load cell and with multiple suppliers of the supply item, the computer being configured to:
      receive reorder parameter data defining reorder parameters for the supply item;
      receive current supplier data for the supply item from the multiple suppliers;
      dynamically compare the current weight of the supply item from the load cell with a reorder threshold weight value; and
      automatically select a selected supplier of the supply item from the multiple suppliers based on a comparison of the reorder parameter data with the current supplier data when the current weight is less than or equal to the reorder threshold weight value.

2. The supply management system of claim 1, further comprising a tag scanner in data communication with the computer and configured to identify the supply item from a code tag associated with the supply item.

3. The supply management system of claim 2, wherein the tag scanner is an optical scanner configured to read an optical code displayed on the code tag associated with the supply item.

4. The supply management system of claim 3, wherein the optical code on the tag code associated with the supply item is one or more of a barcode or a QR code.

5. The supply management system of claim 1, wherein the computer is configured to receive instructions indicating a preferred supplier of the supply item.

6. The supply management system of claim 5, wherein the computer is configured to account for the preferred supplier as a factor when automatically selecting a selected supplier.

7. The supply management system of claim 6, wherein the computer is configured to select the preferred supplier as the selected supplier regardless of the comparison of the reorder parameter data with the current supplier data.

8. The supply management system of claim 1, wherein the platform defines a tray.

9. The supply management system of claim 8, wherein the platform includes:
   a floor; and
   sidewalls extending from the floor.

10. The supply management system of claim 1, wherein:
   the supply management unit defines a first supply management unit;
   the supply management system includes multiple supply management units configured the same as the first supply management unit and in data communication with the computer; and
   the computer is configured to receive from each supply management unit the current weight of multiple supply items supported by the multiple supply management units in a one-to-one ratio.

11. The supply management system of claim 1, further comprising a display in data communication with the computer.

12. The supply management system of claim 11, wherein the computer is configured to display information about the supply item on the display.

13. The supply management system of claim 12, wherein the information about the supply item includes an estimate of a remaining quantity of the supply item.

14. The supply management system of claim 11, wherein:
   the computer is configured to obtain current prices of the supply item from the multiple suppliers; and
   the computer is configured to display the current prices on the display.

15. The supply management system of claim 11, wherein:
   the computer is configured to obtain current availability statuses of the supply item from the multiple suppliers; and
   the computer is configured to display the current availability statuses on the display.

16. The supply management system of claim 11, wherein the computer is configured to display a user interface for ordering a resupply of the supply item from one or more of the multiple suppliers.

17. The supply management system of claim 1, wherein the computer is in data communication with the multiple suppliers via the internet.

18. The supply management system of claim 1, wherein:
   the supply management system further comprises an indicator; and
   the computer is further configured to activate the indicator when the current weight is less than or equal to the reorder threshold weight value.

19. The supply management system of claim 1, wherein the computer is further configured to automatically order a resupply of the supply item from the selected supplier when the current weight is less than or equal to the reorder threshold weight value.

* * * * *